(12) United States Patent
Vitaladevuni et al.

(10) Patent No.: US 9,224,207 B2
(45) Date of Patent: Dec. 29, 2015

(54) SEGMENTATION CO-CLUSTERING

(71) Applicant: Raytheon BBN Technologies Corp., Cambridge, MA (US)

(72) Inventors: Shiv N. Vitaladevuni, Cambridge, MA (US); Rohit Prasad, Acton, MA (US); Premkumar Natarajan, Sudbury, MA (US)

(73) Assignee: RAYTHEON BBN TECHNOLOGIES CORP., Cambridge, MA (US)

( * ) Notice: Subject to any disclaimer, the term of this patent is extended or adjusted under 35 U.S.C. 154(b) by 247 days.

(21) Appl. No.: 14/028,833

(22) Filed: Sep. 17, 2013

(65) Prior Publication Data
US 2014/0079316 A1     Mar. 20, 2014

Related U.S. Application Data

(60) Provisional application No. 61/701,938, filed on Sep. 17, 2012.

(51) Int. Cl.
    *G06T 7/00*     (2006.01)
    *G06K 9/34*     (2006.01)
    *G06K 9/46*     (2006.01)

(52) U.S. Cl.
    CPC ............... *G06T 7/0079* (2013.01); *G06K 9/34* (2013.01); *G06K 9/469* (2013.01); *G06T 7/0081* (2013.01); *G06T 7/0093* (2013.01); *G06K 2209/01* (2013.01); *G06T 2207/20081* (2013.01); *G06T 2207/30176* (2013.01)

(58) Field of Classification Search
    None
    See application file for complete search history.

(56) References Cited

PUBLICATIONS

Belaïd, Abdel, and Nazih Ouwayed. "Segmentation of ancient Arabic documents." Guide to OCR for Arabic Scripts (2011).*
Manohar et al., "Graph Clustering Based Ensemble Method for Handwritten Text Line Segmentation," 11th Annual International Conference on Document Analysis and Recognition, Sep. 18-21, 2011, pp. 574-578.

* cited by examiner

*Primary Examiner* — Samir Ahmed
*Assistant Examiner* — Menatoallah Youssef
(74) *Attorney, Agent, or Firm* — Daly, Crowley, Mofford & Durkee, LLP (57) ABSTRACT

An approach to segmentation or clustering of a set of elements combines separate procedures and uses training data for those procedures on labeled data. This approach is applied to elements being components of an image of text (e.g., printed or handwritten). In some examples, the elements are connected sets of pixels. In images of text, the clusters can correspond to individual lines. The approach provides improved clustering performance as compared to any one of the procedures taken alone.

10 Claims, 6 Drawing Sheets

SEGMENTATION CO-CLUSTERING

CROSS-REFERENCE TO RELATED APPLICATIONS

This application claims the benefit of U.S. Provisional Application No. 61/701,938, filed on Sep. 17, 2012, the contents of which are incorporated herein by reference.

STATEMENT AS TO FEDERALLY SPONSORED RESEARCH

This invention was made with government support under contract HR0011-08-C-0004 awarded by Defense Advanced Research Projects Agency (DARPA). The government has certain rights in the invention.

BACKGROUND

This invention relates to combinations of segmentations, and in particular to clustering based combination of multiple segmentations of images, more particularly images of handwritten or printed text.

Segmentation, and in particular, segmentation of image data, can be a difficult problem. For example, segmentation of scanned handwritten or printed documents into lines of text is a first stage upon which first interpretation of the text may be based. Therefore, errors in such segmentation into lines can lead to significant errors in automated text recognition. Approaches that defer line segmentation decisions can be substantially more complex.

Segmentation of images has many other important applications, for example, in processing of biological images. Furthermore, segmentation of other types of elements in a data representation is an important part of many types of analyses other than for image data. For example, segmentation of sets of individuals into groups is important in many personalization systems.

In many applications, a variety of segmentation tools or procedures are available, each with different characteristics. For example, one tool may provide high accuracy for one class of inputs, while another tool may provide high accuracy for another class of inputs.

SUMMARY

In a general aspect, an approach to segmentation or clustering of a set of elements combines N separate procedures and uses training data for those N procedures on labeled data. This approach is applied to elements being components of an image of text (e.g., printed or handwritten). In some examples, the elements are connected sets of pixels. In images of text, the clusters can correspond to individual lines. The approach provides improved clustering performance as compared to any one of the procedures taken alone.

In some implementations applied specifically to segmentation of an image (e.g., a pixelated and/or optical scan of a document), each of the N procedures for processing an image has (or induces) a binary (or in some cases real-valued) function such that for any image I, and any two elements $g_1$ and $g_2$ have an indicator $S_n(g_1,g_2)=1$ if $g_1$ and $g_2$ are in the same cluster of an image I, and 0 otherwise. Applying all N procedures to a pair of elements yields a N-bit vector $S(g_1,g_2)=(S_1(g_1,g_2), \ldots, S_N(g_1,g_2))$. There are therefore $2^N$ possible bit vectors, s. A training set has a true indicator for any pair of elements in a common image, from which a probabilities Pr(same cluster $|S(g_1,g_2))$ are estimated on the training set.

For a test image, a set of elements G is identified in the same manner as in the test images. The N procedures are applied to pairs of elements $(g_1,g_2)$ in the test image to set weights $w(g_1,g_2)$ determined from (e.g., set equal to) the estimated probabilities Pr(same cluster$|S(g_1,g_2))$, and a graph is constructed with one node per element and edges between nodes weighted according to the determined weights. The graph is partitioned according to an overall utility function based on the edge weights.

The approach can be applied outside image clustering, in a variety of situations in with multiple different clusterings of elements need to be combined.

In one aspect, in general, a computer implemented method is directed to segmenting data. Input data is accepted representing a plurality of elements for segmentation. Each of a plurality of computer-implemented segmentation procedures is applied to the input data. Each segmentation procedure provide a segmentation of the input data that characterize whether pairs of elements are members of a common segment of the input data. Segmentation model data is also accepted. This model data characterizes joint segmentation results of the plurality of segmentation procedures. The segmentation model data and the segmentations are combined to determine, for each of a plurality of pairs of the elements, a factor characterizing a cost of separating the elements in different segments. The factors are processed to determine a partition of the elements, the partition characterizing a segmentation of the accepted input data.

Embodiments can include one or more of the following features.

Accepting the data comprises accepting an image of a document where each element comprises a connected component of the image, and wherein the segmentation of the accepted data comprises a segmentation identifying lines of text in the image.

The method further comprises applying a text recognition procedure to parts of the image of the document selected according to the partition of the elements, and providing output data representing text present in the document.

The plurality of segmentation procedures comprises two or more of: a piecewise projection profile based approach; a directional filter based approach; a filter bank and graph segmentation approach; and a baseline detection approach.

The method further comprises accepting training data, and applying each of the plurality of computer-implemented segmentation procedures to the training data. A predetermined segmentation of the training data is also accepted. The segmentation model data is determined to characterize, for each of a plurality of pairs of elements of the training data, a statistical relationship between membership of the elements of the pair of elements in a common segment of the predetermined segmentation and the segmentation results of the plurality of segmentation procedures.

The method further comprises forming a graph having vertices each corresponding to a different element of the input data, and edges linking elements according to the segmentations of the input data.

Each edge of the graph is weighted according to the determined factor characterizing the cost of separating the elements associated with the vertices linked by the edge in different segments.

Processing the factors to determine the partition of the elements comprises determining a partition of the graph according to a utility function of the weights of the edges and the partition of the vertices of the graph.

In another aspect in general, a computer implemented system is configured to perform all the steps of any of the embodiments identified above.

In another aspect, in general, software stored on a tangible computer-readable medium comprises instructions for causing a data processing system to perform or cause to be performed all the steps of any of the embodiments identified above.

An advantage of one or more aspects is higher accuracy in segmentation than is available using any single of the segmentation approaches. In the problem are of text recognition, higher accuracy in segmenting lines of text in an image provides higher accuracy in interpreting or recognizing the text present in the image.

Other features and advantages of the invention are apparent from the following description, and from the claims.

DESCRIPTION

The description below focuses primarily on a task of segmentation of an image of a handwritten or printed document for the purpose of identifying parts of the image to be processed. In particular, the problem of identifying parts of the image, with each part corresponding to a different line of text is addressed. As is discussed later in this description, the same or very similar techniques can be applied to different problems. Also, in the discussion below the terms "segmentation," "clustering" and "partitioning", as well as "segment", "cluster", and "part", are used somewhat interchangeably in many contexts. For example, the problem of identifying lines of text can be thought of as a segmentation of an image into parts such that each part corresponds to a line, or can be thought of as clustering of small elements (e.g., connected dark pixels) to aggregate them into lines. The distinction is made evident in the description below when it is significant.

In a first implementation, which is directed to the problem of processing an image of a handwritten documents, the input to the system for processing the document is a pixelated image, for example, acquired using an optical scanner or camera at a resolution of 300 pixels per inch, with 1 bit depth (i.e., black and white). It should be understood that this is just one possibility, and other resolutions, color, and depth may be used in other implementations.

Figure 1:
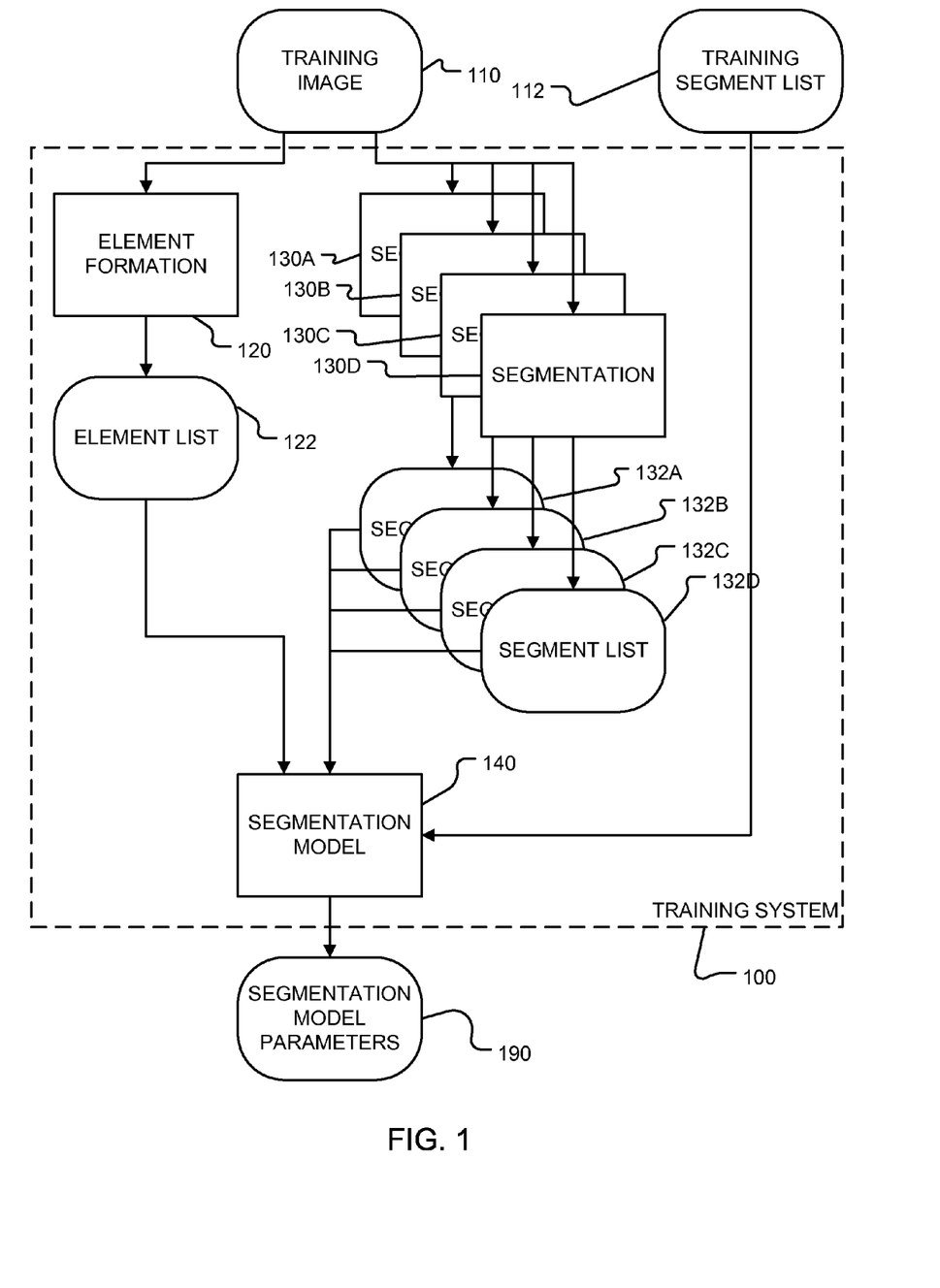
FIG. 1 is a data flow diagram of a training system.

The approach includes a training phase and a segmentation (testing) phase. Referring to FIG. 1, a training system 100 accepts one or more training images 110, each with a corresponding list of segments 112. The training segment list identifies a true segmentation of the image, for example, as a spatial partition of the image into parts, or boundaries of parts, typically where each part corresponds to a line of text. It should be understood that although the approach is described with parts corresponding to lines, the same approach may be applied to other definitions of parts, for example, to smaller units such as words, or larger parts, such as paragraphs. An output, the training system 100 is a set of segmentation model parameters 190, which are then used by the segmentation system 200 shown in FIG. 2.

Continuing to refer to FIG. 1, the training system 100 makes use of a set of separate segmentation modules 130A-D. Each segmentation module implements a fixed approach to segmentation. Preferably, the segmentation modules exhibit a diversity of techniques so that different modules will exhibit different characteristics of errors. A more detailed discussion of the segmentation modules is provided later in this document. Each segmentation module accepts the training image 110. Together, the segmentation modules 130A-D produce corresponding segment lists 132A-D. Each segment list identifies a set of regions of the image that the corresponding segmentation module has identified as belonging to one segment, for example, to one line of text.

Figure 2:
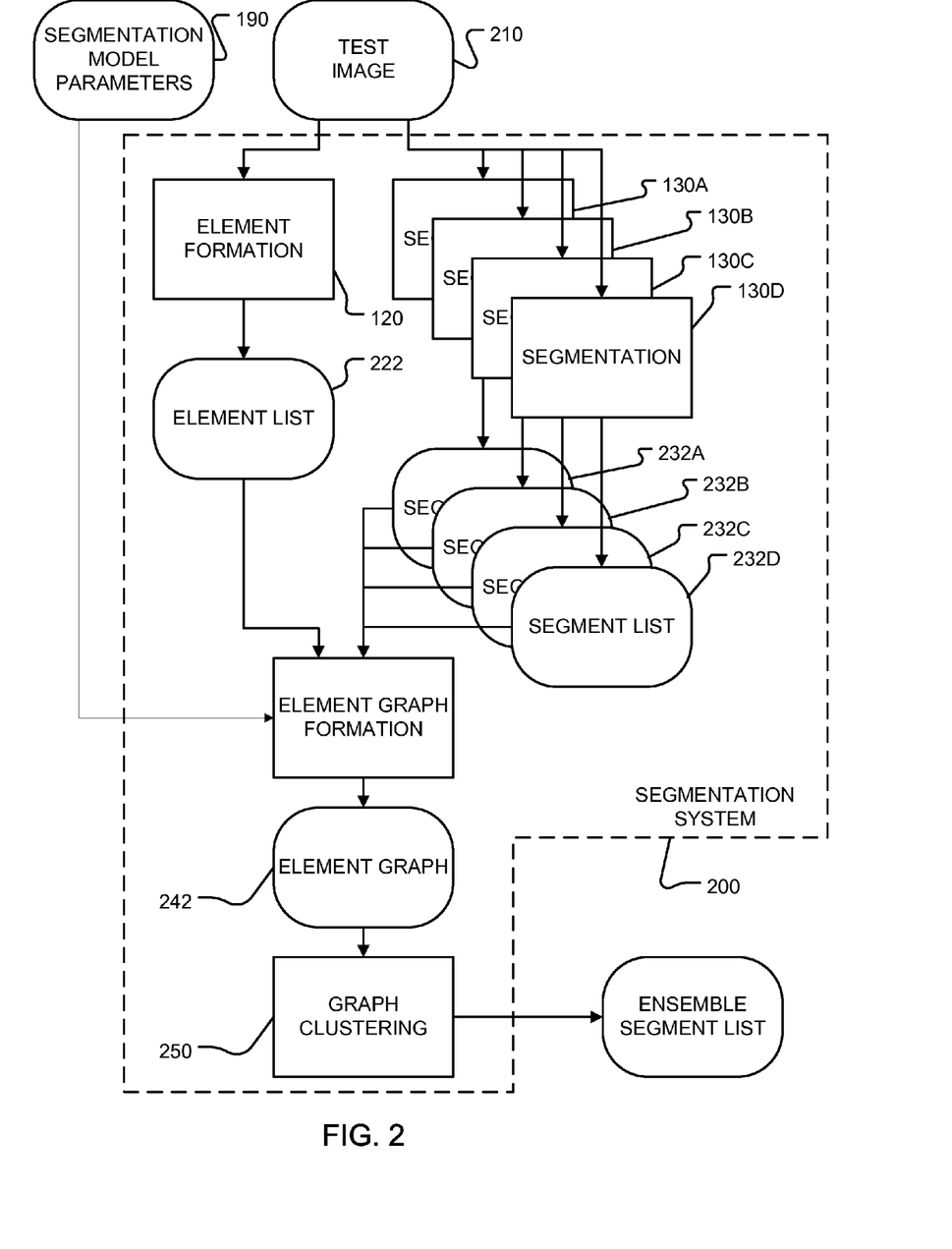
FIG. 2 is a data flow diagram of a test system.

The training system 100 also includes an element formation module 120. Although some embodiments may function at the pixel level (e.g., each pixel is its own element), as illustrated in FIGS. 1-2, the element formation module 120 identifies groups of pixels (essentially small regions of the image) which are assumed to belong to only a single segment. As one example, connected sets of dark pixels are treated as elements, but other definitions of elements can be used, for example, based on detection of known glyph shapes or on image properties that permit small breaks in the connected regions. The output of the element formation module 120 is an element list 122.

Any pair of elements in the list of elements 122 is treated as being a same cluster of elements if each element of the pair is in the same segment of the training segment list 112. In some implementations, an element is treated as in a segment if at least some of the spatial extent of the element is within the region defined for a segment, while in other implementations, the element is required to be fully within the segment region.

Similarly, any pair of elements is considered to be in the same cluster of elements according to a particular one of the segmentation modules 130A-D (e.g., according to module 130A) if each element of that pair of elements similarly is in a same segment region in the segment list output (e.g., segment list 132A) of that segmentation module.

For any two elements $g_1$ and $g_2$ of the element list 122, an indicator of their presence in a true training segment can be defined as $T(g_1,g_2)=1$ if they are in the same segment, and $T(g_1,g_2)=0$ otherwise. Similarly, based on the segment list 132A-D of the $n^{th}$ segmentation module 130A-D, an indicator $S_n(g_1,g_2)=1$ if $g_1$ and $g_2$ are in the same segment, and 0 otherwise. Applying all N procedures to a pair of elements yields a N-bit vector $S(g_1,g_2)=(S_1(g_1,g_2), \ldots, S_N(g_1,g_2))$. There are therefore $2^N$ possible bit vectors, s.

The segmentation module 140 first forms a set of training items, each item being associated with a pair of elements from the element list 122. Each training item is a tuple $(T(g_1,g_2), S(g_1,g_2))$. A set of segmentation model parameters, denoted $\theta$, characterize the statistical distribution $Pr_\theta(t|s)$ where t is the training indicator and s is the bit vector of segmentation outputs.

One approach characterizing the distribution $Pr_\theta(t|s)$ is to enumerate all possible bit vectors s and compute $Pr_\theta(t=1|s)$ as the count of the number of pairs with that value of s where the elements are in the same segment (i.e., t=1) divided by the count of the number of pairs with that value of s. Other probabilistic models and structures can also be used, for example but not limited to, logistic regression, classification trees, neural networks etc. In any case, a set of parameters provide a mapping from any combination of outputs, s of the segmenters to a probability (or other measure) characterizing whether that pair of elements should be clustered into one segment.

Referring to FIG. 2, the segmentation parameters θ 190 are used by a segmentation system 200 to process a test image 210 to yield a segment list 290, which identifies the set of segments for further processing. In the case of an image of handwritten or printed text, this further processing typically involves character recognition on a line by line basis.

The segmentation system includes a number of modules that are the same as in the training system 100. The element formation module 120 uses the same procedure as in training to identify a set of elements 222 of the test image (e.g., connected sets of dark pixels). Similarly, each of the segmentation modules 130A-D are applied to the test image 210 to yield segmentation lists 232A-D for the test image.

The next step of segmentation is implemented by a graph formation module 240 that form a data representation of an element graph G=(V,E) 242 in which each vertex (node) corresponds to a different one of the elements in the element list 222. These vertices are denoted V={$v_i$} where $v_i$ corresponds to the element $g_i$ in the element list 222. Generally, the segmentation procedure involves first forming weighted edges E based on the segmentation lists 232-A-D. Then, this graph is partitioned (i.e., vertices are clustered) according to an overall utility function to identify clusters of vertices. These clusters of vertices then yield the ensemble segment list 290, which represents the segmentation of the test image 210 into regions.

The edges E are determined such that an edge between a vertex $v_i$ and $v_j$ is added if $S_n(g_i,g_j)=1$ for some segmenter n. In some implementations, some further edges are added to the graph. For example, an edge between a vertex joining $v_i$ and $v_j$ is added even if $S(g_i,g_j)$ is a vector of all zeros (i.e., no segmenter declared them as in the same segment) as long as there is some other element $v_k$ such that $v_i$ and $v_k$ are in one segment according to one segmenter (i.e., $S_m(g_i,g_k)=1$)) and $v_k$ and $v_j$ are in one segment according to another segmenter (i.e., $S_n(g_k,g_j)=1$)).

The cost $w_{i,j}$ of an edge $(v_i,v_j)$ is based on the output of the segmenters $S(g_i,g_j)$. In particular this cost is set according to the probability $p_{i,j}=Pr_\theta(t=1|S(g_i,g_j))$, which is based on the segmentation model parameters θ 190. In some implementations, rather than using the probabilities $p_{i,j}$ directly as weights, weights in a range [−1.0, 1.0] are set as $w_{i,j}=(1-2p_{i,j})$.

Turning now to the graph clustering module 250, the task implemented by the module is to partition the nodes into C={$C_k$} subsets, where $1 \le k \le |C|$, so as to minimize a total cost of partitioning the graph:

$$W = \sum_{C_k \in C} \left( \sum_{v_i,v_j \in C_k} w_{i,j} \right)$$

subject to a constraint that no two subsets overlap ($C_k \cap C_l = \phi$ $\forall C_k, C_l$) and that the subsets together account for all the vertices $$\left( \bigcup_{C_k \in C} C_k = V \right).$$

When the number of clusters, |C|, is known then this can be viewed as a k−min cut problem, which has a polynomial time algorithm for non-negative weights and known k. In our application, the number of lines in the image (number of clusters) is not known a-priori, and the weights may be negative. In at least some implementations, the minimization problem is implemented using a technique described in "Co-Clustering of Image Segments Using Convex Optimization Applied to EM Neuronal Reconstruction," IEEE Conference on Computer Vision and Pattern Recognition (CVPR), 13-18 Jun. 2010, which is incorporated herein by reference.

In one implementation of the clustering procedure, a metric space of distances between the graph nodes is induced by clustering. In this formulation, we let $d_{i,j}$ denote the distance between nodes $v_i$ and $v_j$ in the cluster space. If $d_{i,j}=0$, they are put in the same cluster; if $d_{i,j}=1$, they are put in distinct clusters. Thus, the set of distances between all pairs of nodes defines the clustering. Metric properties of positivity, symmetry, and triangular inequality are enforced through linear inequalities. An optimization of the total total cost W is implemented by maximizing $$\sum_{i,j} w_{i,j} d_{i,j}$$

subject to contraints on the values of the distances $$s.t.: 0 \le d_{i,j} \le 1,\ d_{i,j}=d_{j,i},\ d_{i,i}=0$$

and a triangle inequality constraint $$d_{i,j} \le d_{i,k} + d_{k,j}\ \forall e_{i,j}, e_{i,k}\ \text{and}\ e_{k,j} \in E$$

Ideally, the distances computed as a solution to this optimization would be binary. However, linear programs do not guarantee integral solutions unless the constraint matrix is Totally Unimodular (TUM). Although it can be shown that in general the constraint matrix above is not TUM, in practice linear programming solutions generated in this application are typically very sparse, with predominantly binary values. A simple thresholding (e.g., at 0.6) is used to convert real-valued solutions to binary values.

When the cost/benefit of mergers and splits, defined as $\lambda_{0,1}$ for correct grouping into one segment, $\lambda_{1,0}$ for correct separation into separate segments, $\lambda_{0,0}$ for incorrect grouping and $\lambda_{1,1}$ for incorrect separation, is set at $\lambda_{0,1}=\lambda_{1,0}=-\lambda_{0,0}=-\lambda_{1,1}=\lambda$, the optimization function above becomes $\lambda \Sigma_{i,j}(1-2p_{i,j})d_{i,j}$. Thus, the λ parameter has no effect and is set to λ=1. In practical handwriting recognition tasks, the cost parameters may be useful for trade-off between false splits and mergers, which may be important for optimizing recognition performance.

It should be understood that the clustering approach identified above is just one possible way of clustering the elements. For example, approaches including without limitation agglomerative clustering and spectral clustering can be used.

Figure 3A:
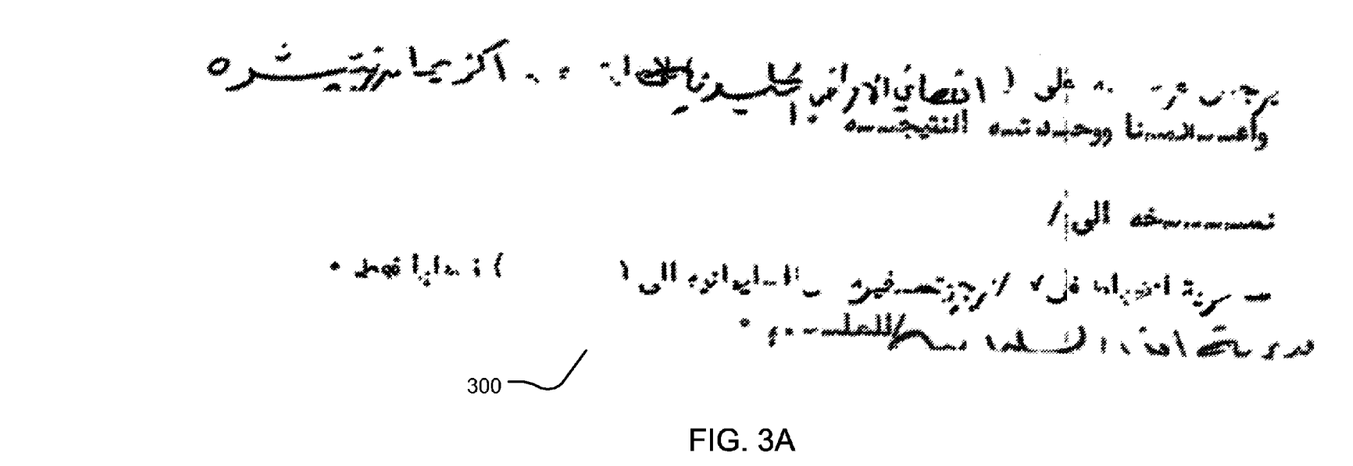
FIGS. 3A-B are an example image and a true segmentation
Figure 3B:
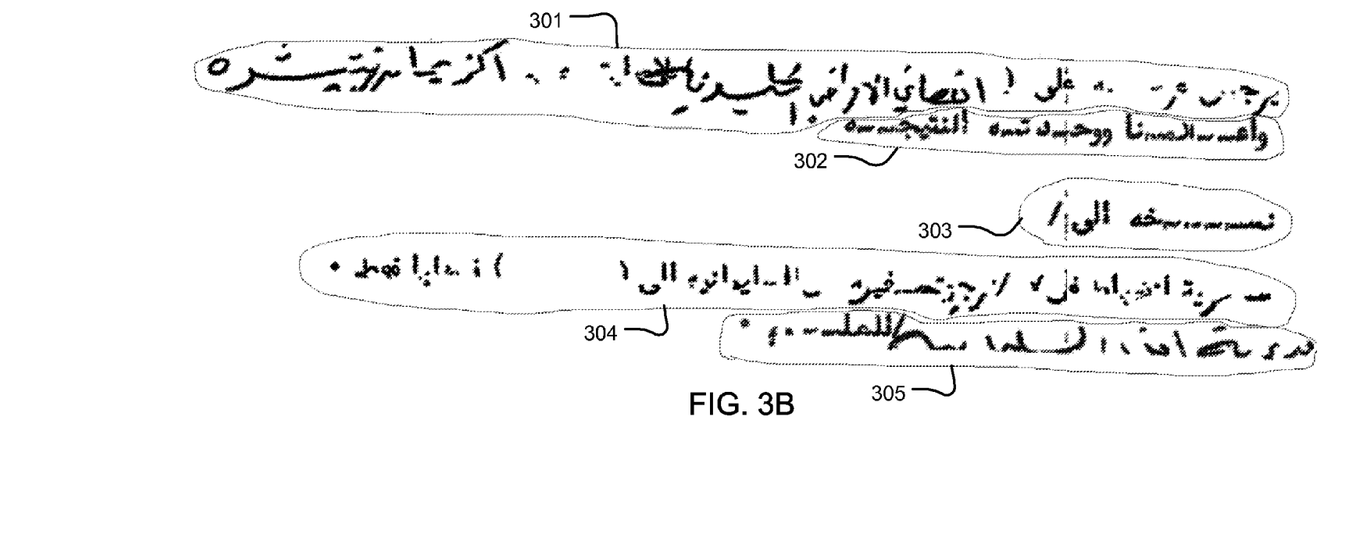

The approach described in general is applied to a problem of arabic handwriting recognition of an image 300 shown in FIG. 3A. The true segmentation is shown by segments 301-305 shown in FIG. 3B.

Four separate image segmenters are applied to the image 300, with the corresponding results shown in FIGS. 4A-D. The segmenters represent two "top down" methods and two "bottom up" methods.

Figure 4A:
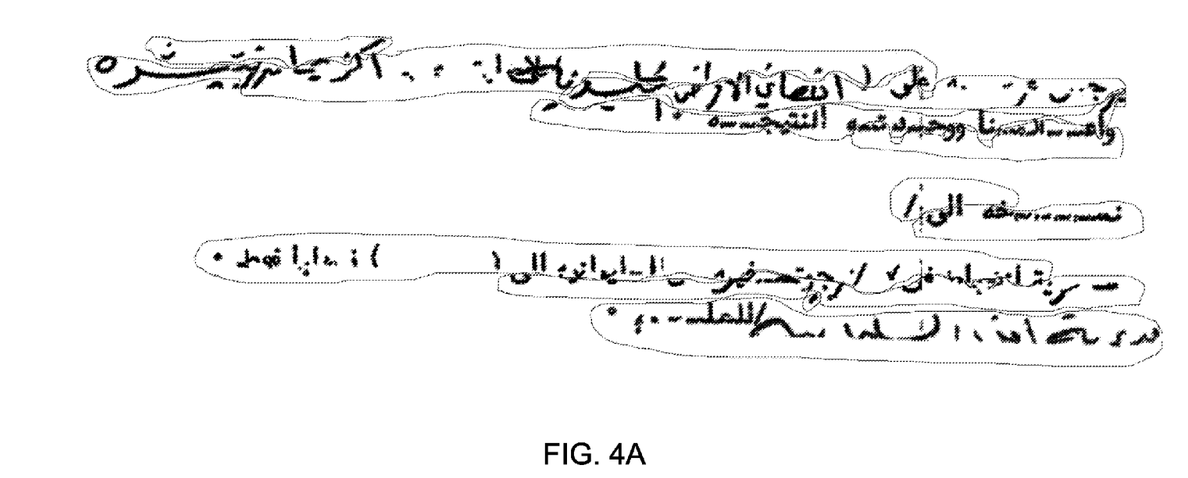
FIGS. 4A-D are segmentations of the image of FIG. 3A produced using different segmenters.

The first segmenter 130A uses a piecewise projection profile based approach: In this method, lines were segmented based on piece-wise horizontal projection profiles of the document obtained at an interval determined by the average width of connected components and the page width. Once the projection profiles were obtained, initial set of candidate lines were generated by connecting the valleys in the current profile to the closest valley in the previous profile. For the unmapped valleys, a straight line was continued from the valley. Using the initial set of candidate lines, lines were drawn parallel. Any line drawn may be obstructed by a handwritten component. A decision was made to associate this component to the line above or below through a Gaussian probability decision based on the spatial proximity of the foreground pixels to the line. The segment list for this segmenter is illustrated in FIG. 4A.

Figure 4B:
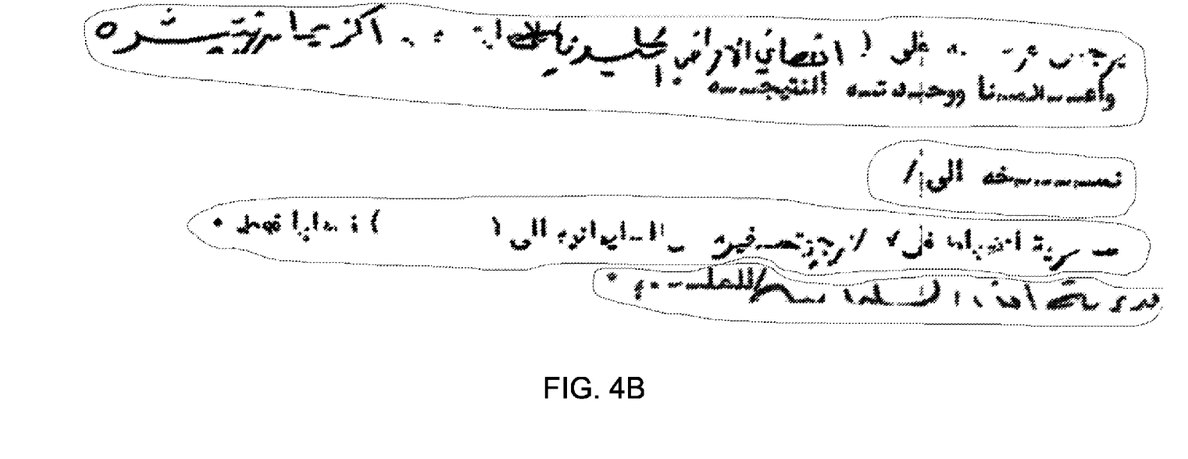

The second segmenter 130B uses a directional filter based approach: This method is based on steerable directional filter, which found the local orientation of a text line by scanning in multiple directions. The maximum response from a convolution of the filter with the image was the estimated direction of the text line. Specifically, the algorithm had the following key steps: first, a stroke segment that crossed a text line was automatically detected. Next, a reference line for splitting touching lines was estimated based on centers of gravity of the contours from the detected lines. Finally, touching components were split at the contour level and the character images were reconstructed. The segment list for this segmenter is illustrated in FIG. 4B.

Figure 4C:
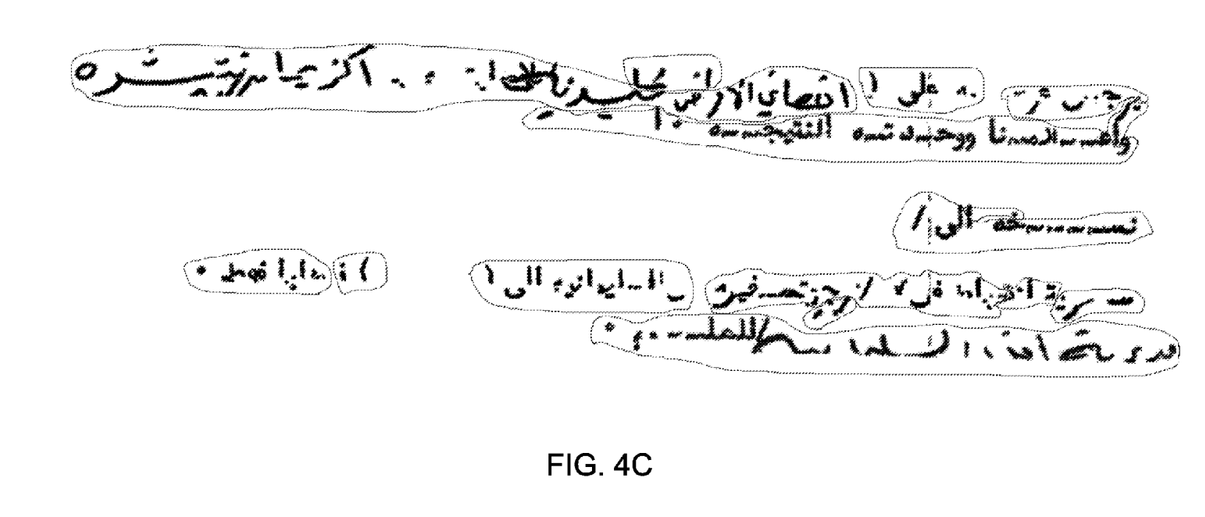

The third segmenter 130C uses a method based on filter banks and graph segmentation: The first stage of the algorithm applied a bank of anisotropic Gaussian filters of different orientations and scales. The second stage modeled the document as an undirected weighted graph, where each connected component was represented by a node in the graph. Affinity Propagation (AP) method was then used to segment the graph. The advantage of using AP is that the number of sub-graphs that denote text lines need not be specified a priori. The segment list for this segmenter is illustrated in FIG. 4C.

Figure 4D:
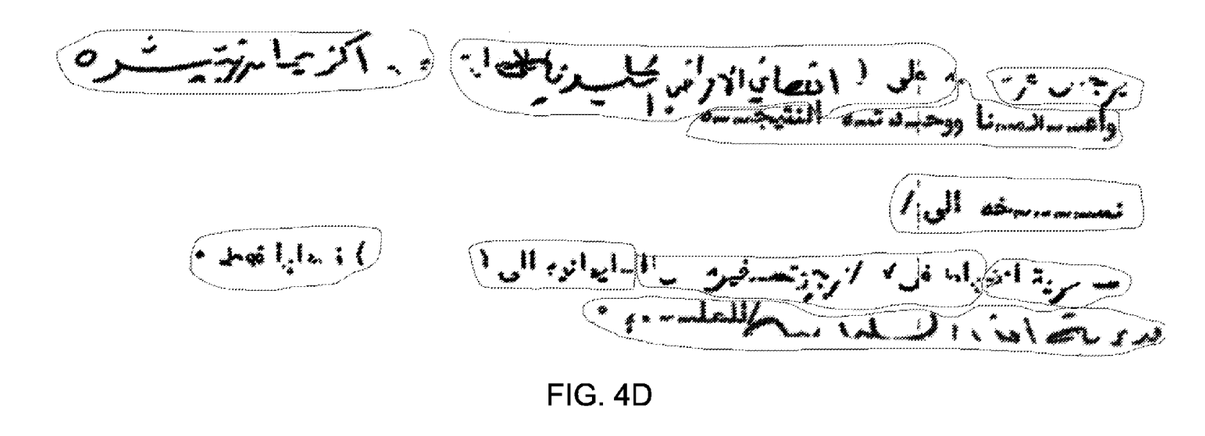

The fourth segmenter 130D uses a method based on baseline detection: In the first step of this method, any small dots or diacritics like components were removed from the input image. Then, baseline detection was performed by computing candidate lines that passed through text characters and the line that picked the most number of text pixels on its way was chosen. All connected components that passed through this line were marked so that in the next iteration these components were not included into the voting process. In order to prevent detection of false baselines, a dynamic threshold was estimated for the vote, which depended on the average text line length in the document. Once all baselines were estimated, text characters which were still unmarked were associated to the closest baseline. In the last step, diacritics were linked to the closest text character. The segment list for this segmenter is illustrated in FIG. 4D.

Figure 5:
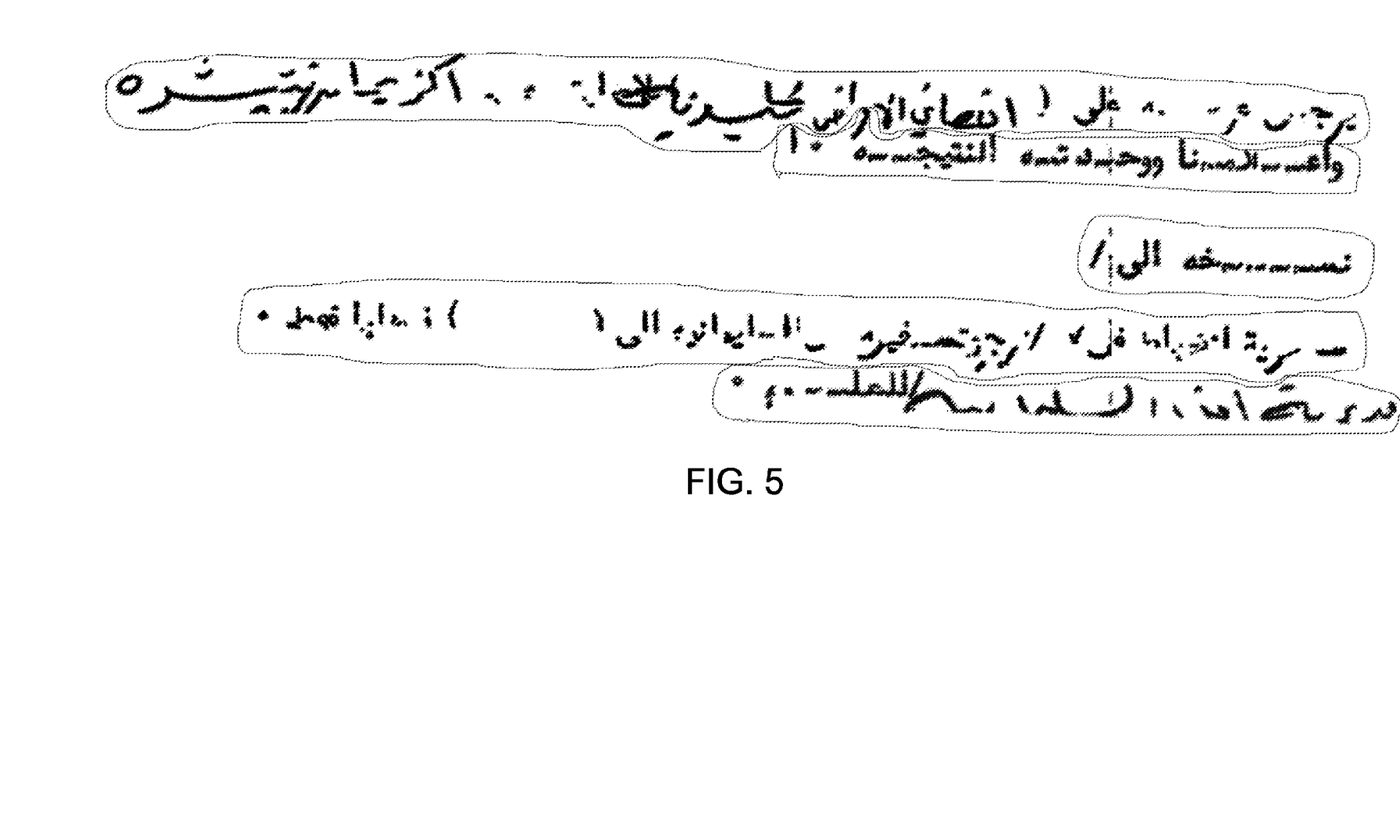
FIG. 5 is an ensemble segmentation of the image of FIG. 3A determined from the segmentation shown in FIGS. 4A-D.

In this example, the segmentation model parameters θ 190 consists of the 16 probabilities, each corresponding to a different combination of segmenter outputs. For reference, these probabilities range from 0.01 when all segmenters have a zero output, and 0.86 when all segmenters declare that the elements are in the same segment. Based on these probabilities, and the co-clustering approach identified above, the resulting segment list 290 is illustrated in the segmentation of FIG. 5.

It should be understood that in some embodiments, the segmenter outputs are not necessary binary. For example, a segmenter may provide a real-valued quantity indicating that any pair of pixels belongs to the same segment. In such a case, the segmentation model is formed to accept such real-valued inputs to provide a probability of membership in a same cluster.

Implementations of the approaches described above may includes software (code) stored on non-transitory computer-readable media (e.g., a computer disk). The software can include instructions for causing a data processing system (e.g., a general purpose computer) to perform the steps of the procedures described above. The instructions can include low-level machine instructions, or high-level language statements. In some implementations, the segmentation model parameters, in conjunction with specification of (e.g., identification of, code for, etc.) the segmenters are stored on a computer-readable medium, optionally in conjunction with other instructions for the segmentation system, for imparting functionality to a segmentations system.

It is to be understood that the foregoing description is intended to illustrate and not to limit the scope of the invention, which is defined by the scope of the appended claims. Other embodiments are within the scope of the following claims.

What is claimed is:

1. A computer implemented method of segmenting data comprising:
    accepting input data representing a plurality of elements for segmentation;
    applying each of a plurality of computer-implemented segmentation procedures to the input data to determine respective segmentations of the input data, wherein each segmentation characterizes membership of pairs of elements in common segments of the input data wherein the plurality of segmentation procedures comprises: a piecewise projection profile based approach; a directional filter based approach; a filter bank and graph segmentation approach; and a baseline detection approach;
    accepting segmentation model data characterizing joint segmentation results of the plurality of segmentation procedures;
    combining the segmentation model data and the segmentations to determine, for each of a plurality of pairs of the elements, a factor characterizing a cost of separating the elements in different segments; and
    processing the factors to determine a partition of the elements, the partition characterizing a segmentation of the input data.

2. The method of claim 1 further comprising determining the plurality of elements represented in the input data independently of the segmentation procedures.

3. The method of claim 2 wherein the input data represents a pixelated image, and where the elements comprise connected regions of marked pixels.

4. The method of claim 1 wherein accepting the data comprises accepting an image of a document where each element comprises a connected component of the image, and wherein the segmentation of the accepted data comprises a segmentation identifying lines of text in the image.

5. The method of claim 4 wherein the method further comprises:
    applying a text recognition procedure to parts of the image of the document selected according to the partition of the elements; and
    providing output data representing text present in the document.

6. The method of claim 1 further comprising:
    accepting training data;
    applying each of the plurality of computer-implemented segmentation procedures to the training data;
    accepting a predetermined segmentation of the training data; and
    determining the segmentation model data to characterize, for each of a plurality of pairs of elements of the training data, a statistical relationship between membership of the elements of the pair of elements in a common segment of the predetermined segmentation and the segmentation results of the plurality of segmentation procedures.

7. The method of claim 1 further comprising forming a graph having vertices each corresponding to a different element of the input data, and edges linking elements according to the segmentations of the input data.

8. The method of claim 7 wherein each edge of the graph is weighted according to the determined factor characterizing the cost of separating the elements associated with the vertices linked by the edge in different segments.

9. The method of claim 8 wherein processing the factors to determine the partition of the elements comprises determining a partition of the graph according to a utility function of the weights of the edges and the partition of the vertices of the graph.

10. Software stored on a non-transitory machine-readable medium comprising instructions for causing a data processing system to:
    accept input data representing a plurality of elements for segmentation;
    apply each of a plurality of computer-implemented segmentation procedures to the input data to determine respective segmentations of the input data, wherein each segmentation characterizes membership of pairs of elements in common segments of the input data wherein the plurality of segmentation procedures comprises: a piecewise projection profile based approach; a directional filter based approach; a filter bank and graph segmentation approach; and a baseline detection approach;
    accept segmentation model data characterizing joint segmentation results of the plurality of segmentation procedures;
    combine the segmentation model data and the segmentations to determine, for each of a plurality of pairs of the elements, a factor characterizing a cost of separating the elements in different segments; and
    process the factors to determine a partition of the elements, the partition characterizing a segmentation of the input data.

* * * * *